US012656604B2

(12) United States Patent
 Abe

(10) Patent No.: US 12,656,604 B2
(45) Date of Patent: Jun. 16, 2026

(54) DISPLAY DEVICE

(71) Applicant: SONY GROUP CORPORATION, Tokyo (JP)

(72) Inventor: Kuniya Abe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 376 days.

(21) Appl. No.: 18/264,608

(22) PCT Filed: Jan. 20, 2022

(86) PCT No.: PCT/JP2022/001994
§ 371 (c)(1),
(2) Date: Aug. 8, 2023

(87) PCT Pub. No.: WO2022/176495
PCT Pub. Date: Aug. 25, 2022

(65) Prior Publication Data
US 2024/0111151 A1 Apr. 4, 2024

(30) Foreign Application Priority Data
Feb. 16, 2021 (JP) ................................. 2021-022625

(51) Int. Cl.
*G02B 27/00* (2006.01)
*G02B 26/10* (2006.01)
*G02B 27/01* (2006.01)
*G02B 27/02* (2006.01)

(52) U.S. Cl.
CPC ....... *G02B 27/0093* (2013.01); *G02B 26/105* (2013.01); *G02B 27/0172* (2013.01); *G02B 27/026* (2013.01)

(58) Field of Classification Search
CPC .............. G02B 27/0093; G02B 26/105; G02B 27/0172; G02B 27/026
See application file for complete search history.

(56) References Cited

FOREIGN PATENT DOCUMENTS

| JP | 59-104619 A | 6/1984 |
| JP | 2002-354029 A | 12/2002 |
| JP | 2011-123465 A | 6/2011 |
| JP | 2011215398 A | 10/2011 |
| JP | 2020-510870 A | 4/2020 |

(Continued)

OTHER PUBLICATIONS

JP 2011215398 A (Takayama Haruhisa et al.) machine translation (Year: 2011).*

(Continued)

*Primary Examiner* — James A Dudek
(74) *Attorney, Agent, or Firm* — CHIP LAW GROUP

(57) ABSTRACT

Provided is a display device of the present invention that includes a scanning mirror drive unit that drives a scanning mirror such that, in a case where two or more mutually different non-resonant axial direction scanning speeds are used in a drawing region of one frame of a video formed by a laser light scanning, non-resonant axial direction scanning speed gradually changes between the different non-resonant axial direction scanning speeds. The display device further includes a hologram element that condenses laser light near a pupil to cause the laser light to reach a retina, the laser light being scanned by the scanning mirror.

12 Claims, 6 Drawing Sheets

(56)         References Cited

FOREIGN PATENT DOCUMENTS

| WO | 2010/044205 | A1 | 4/2010 |
| WO | WO-2016203991 | A1 | 12/2016 |
| WO | WO-2018160507 | A1 | 9/2018 |
| WO | 2020/110757 | A1 | 6/2020 |

OTHER PUBLICATIONS

WO 2018160507 Machine translation (Year: 2018).*
International Search Report and Written Opinion of PCT Application No. PCT/JP2022/001994, issued on Apr. 12, 2022, 10 pages of ISRWO.

* cited by examiner

DISPLAY DEVICE

CROSS REFERENCE TO RELATED APPLICATIONS

This application is a U.S. National Phase of International Patent Application No. PCT/JP2022/001994 filed on Jan. 20, 2022, which claims priority benefit of Japanese Patent Application No. JP 2021-022625 filed in the Japan Patent Office on Feb. 16, 2021. Each of the above-referenced applications is hereby incorporated herein by reference in its entirety.

TECHNICAL FIELD

The present disclosure relates to a display device. More specifically, the present disclosure relates to a display device including a scanning mirror.

BACKGROUND ART

In recent years, attention has been focused on technology of superimposing an image on a scene of an outside world. The technology is also referred to as augmented reality (AR) technology, and AR glasses can be cited as a product utilizing the technology. Examples of the AR glasses include devices using a display and devices using laser beam scanning (also referred to as LBS).

For AR glasses using the LBS, a Foveated rendering technology may be used. This technology slows down scanning speed of MEMS only in a part that a user is gazing at (in particular, only in a fovea part), which relaxes the required MEMS specification. Regarding a device utilizing this technology, for example, Patent Document 1 below discloses "A scanning display system, comprising: a laser light mirror system comprising two or more offset lasers; a scanning mirror system configured to scan light from the laser light source in a first direction at a higher frequency, and in a second direction at a lower frequency to form an image; and a controller configured to control the scanning mirror system to scan the laser light with an interlaced pattern to form the image, and adjust one or more of a scan rate in the second direction and a phase offset between a first frame and a second frame of the image." (Claim 1).

CITATION LIST

Patent Document

Patent Document 1: Japanese Translation of PCT Application No. 2020-510870

SUMMARY OF THE INVENTION

Problems to be Solved by the Invention

In the field related to AR glasses, it is required to achieve both a wide angle of view and high resolution. The AR glasses using the display described above can achieve a wide angle of view but have a low resolution (PPD). Meanwhile, because the AR glasses using the LBS are of the Scan method, it is necessary to increase the number of scanning lines in one frame if an angle of view is widened while maintaining the resolution. In order to deal with an increase in the number of scanning lines, a scanning mirror having higher performance is required.

The Foveated rendering technology may be utilized to relax performance of the required scanning mirror. However, with this technology, operation of the scanning mirror may be unstable due to rapid speed change of the scanning mirror. For example, the speed change may cause unnecessary vibration of the scanning mirror. The unnecessary vibration may cause image quality degradation.

Furthermore, if the Foveated rendering technology is utilized, a region where a scanning line is light in density e and a region where the scanning line is heavy in density are generated before and after the scanning speed of the scanning mirror changes. This may affect an output video, and an optimum image quality may not be obtained. In order to improve image quality, a complex control system is also required.

An object of the present disclosure is to provide technology for eliminating image quality degradation that may occur in a case where the Foveated rendering technology is utilized.

Solutions to Problems

The present disclosure provides a display device including a scanning mirror drive unit that drives a scanning mirror such that, in a case where two or more mutually different non-resonant axial direction scanning speeds are used in a drawing region of one frame of a video formed by a laser light scanning, non-resonant axial direction scanning speed gradually changes between the different non-resonant axial direction scanning speeds.

The display device may further include a scanning mirror that performs laser light scanning for forming the video.

The scanning mirror drive unit may execute change in the scanning speed so that scanning mirror vibration caused by a mechanical resonance characteristic unique to the scanning mirror does not occur.

The scanning mirror drive unit may execute change in the scanning speed so that resonance of the scanning mirror does not occur.

In a period in which the scanning speed gradually changes, the scanning mirror drive unit may apply, to the scanning mirror, a voltage having a frequency component sufficiently lower than a resonance frequency component of the scanning mirror, or a voltage having a voltage waveform in which a harmonic component of a waveform of voltage applied does not overlap the resonance frequency component of the scanning mirror.

With respect to the scanning by the display device, a non-resonant axial direction scanning speed of laser light reaching a region including a fovea may be slower than a non-resonant axial direction scanning speed of laser light reaching a region not including the fovea.

The display device may further include two or more laser beams having mutually different beam diameters.

On the scanning mirror, the beam diameter of the laser light reaching the region including the fovea may be greater than the beam diameter of the laser light reaching the region not including the fovea.

The display device may further include a line-of-sight detection unit.

On the basis of a detected line-of-sight, the line-of-sight detection unit may identify a region including the fovea.

The scanning mirror drive unit may drive the scanning mirror on the basis of a region including the fovea identified by the line-of-sight detection unit.

The display device may be configured to condense the laser light near a pupil to cause the laser light to reach a retina, the laser light being scanned by the scanning mirror.

The display device may be configured to cause laser light scanned by the scanning mirror to reach a projection surface without through a projection optical system, or through a projection optical system.

MODES FOR CARRYING OUT THE INVENTION

Figure 1A:
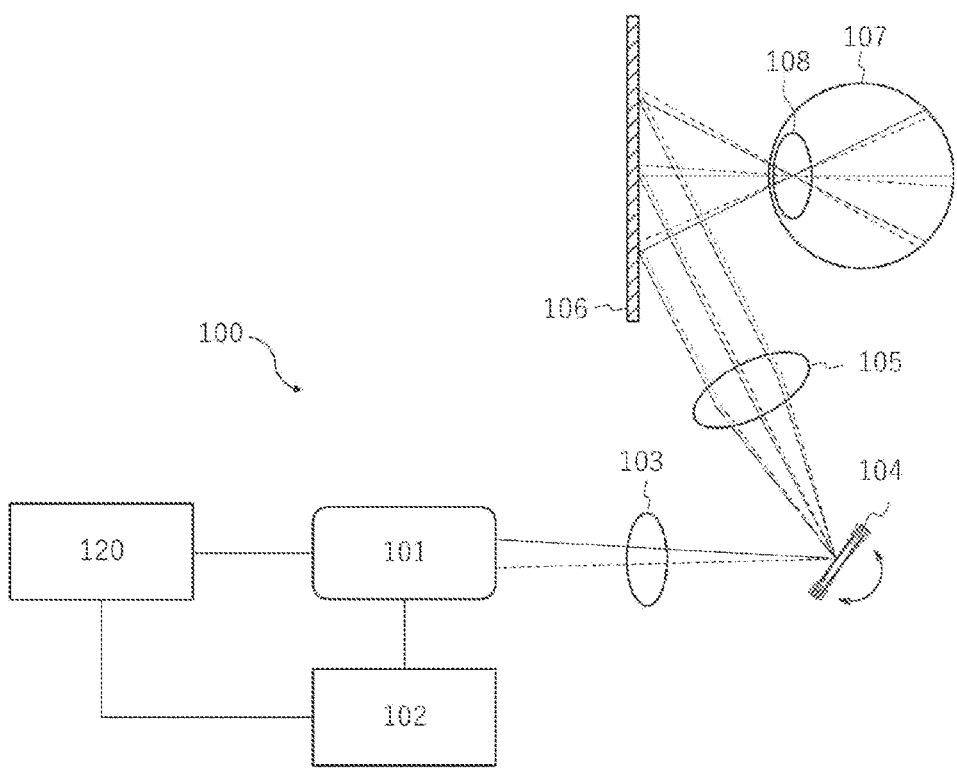
FIG. 1A is a diagram illustrating a configuration example of a display device according to the present disclosure.

Hereinafter, preferred embodiments for carrying out the present disclosure will be described. Note that the embodiments described below are typical embodiments of the present disclosure, and the scope of the present disclosure should not be limited to these embodiments. Note that the present disclosure will be described in the following order.

1. Basic concept of present disclosure
2. First embodiment of present disclosure (retina direct drawing type display device)
2-1. First example of first embodiment (drawing system including two laser drive units)
(1) Scanning mirror and scanning mirror drive unit
(2) Laser light source unit and laser drive unit
(3) Line-of-sight detection unit
(4) Other components
(5) Modifications
2-2. Second example of first embodiment (drawing system including one laser drive unit)
3. Second embodiment of present disclosure (projector)

1. Basic Concept of Present Disclosure

With regard to the Foveated rendering technology, as described above, a problem of image quality degradation due to unnecessary vibration of a scanning mirror and/or a problem of image quality degradation due to a change in a scanning line interval may occur.

The present disclosure provides a display device including a scanning mirror drive unit that drives a scanning mirror such that, in a case where two or more mutually different scanning speeds (in particular, non-resonant axial direction scanning speeds) are used in a drawing region of one frame of a video formed by a laser light scanning, scanning speed gradually changes between the different scanning speeds. With the scanning mirror drive unit that drives the scanning mirror as described above, occurrence of unnecessary vibration of the scanning mirror can be reduced or prevented. As a result, it is possible to prevent occurrence of unnecessary vibration in a case where the Foveated rendering technology is applied, and to improve image quality. Furthermore, it is possible to achieve both a wide angle of view and high resolution while relaxing performance required for the scanning mirror.

Patent Document 1 described above does not disclose image quality degradation due to unnecessary vibration of the scanning mirror as described above and image quality degradation due to a change in a scanning line interval. Moreover, a technology of addressing these problems is not disclosed. The present disclosure can solve these problems of image quality degradation.

Furthermore, according to the present disclosure, for example, it is possible to achieve a wide angle of view and/or high resolution of a video presented by using a scanning mirror while utilizing video data conforming to video standards of various resolutions such as HD, full HD, 4K, and 8K and existing devices conforming to these video standards. For example, a video receiver that receives video data from outside of the display device and/or a video processor that converts the video data into a digital signal can achieve a wide angle of view and/or high resolution of a video presented by using the scanning mirror while utilizing an existing product.

In one embodiment of the present disclosure, the scanning speed may be scanning speed in a non-resonant axial direction. While the scanning speed in the non-resonant axial direction is changed by the Foveated rendering technology, the present disclosure eliminates image quality degradation associated with application of the technology. Note that the scanning speed may be scanning speed in a resonant axial direction.

The display device according to the present disclosure may further include a scanning mirror that performs laser light scanning for forming the video. For example, the scanning mirror may be a micro electro mechanical systems (MEMS) mirror.

As the MEMS mirror, a commercially available MEMS mirror may be used, or a MEMS mirror manufactured by a method known in the art may be used. MEMS mirrors may be typically fabricated by microfabrication technologies of semiconductor processes. The MEMS mirror scans light by resonance of a minute mirror of about $\Phi 1$ mm.

The scanning mirror may be a scanning mirror operable in two axial directions, or may be a combination of two scanning mirrors capable of scanning in one axial direction. As a result, a two-dimensional video can be projected.

In the present disclosure, the scanning speed is scanning speed in the non-resonant axial direction, and the scanning mirror drive unit may execute change in the scanning speed so that resonance of the scanning mirror does not occur. The resonance may be, for example, a resonance that occurs in a case where the Foveated rendering technology is applied, and more particularly, may be a resonance that occurs in a case where the scanning speed in the non-resonant axial direction is changed by the application of the Foveated rendering technology.

In particular, the scanning speed may be scanning speed in the non-resonant axial direction, and, in a period in which the scanning speed gradually changes, the scanning mirror drive unit may apply, to the scanning mirror, a voltage having a frequency component sufficiently lower than a resonance frequency component of the scanning mirror, or a voltage having a voltage waveform in which a harmonic component of a waveform of voltage applied does not overlap the resonance frequency component of the scanning mirror. By executing the change in the scanning speed as described above, occurrence of the unnecessary vibration can be prevented, and image quality degradation associated with unnecessary vibration can be more effectively prevented.

In a preferred embodiment of the present disclosure, the scanning mirror drive unit may execute change in the scanning speed so that scanning mirror vibration caused by a mechanical resonance characteristic unique to the scanning mirror does not occur. The scanning mirror has a mechanical resonance characteristic unique to the scanning mirror. If a frequency component of a waveform of voltage (corresponding to an oscillation angle waveform) applied to the scanning mirror becomes close to the mechanical resonance characteristic, the resonance characteristic of the scanning mirror may appear, and unnecessary vibration may occur. By the scanning speed gradually changing so that unnecessary vibration caused by the mechanical resonance characteristic does not occur, the above-described problem of image quality degradation can be more effectively solved.

In a preferred embodiment of the present disclosure, the scanning mirror drive unit may execute change in the scanning speed so that a value of the frequency component of the drive voltage waveform in the drawing region is smaller than a value of the mechanical resonance characteristic of the scanning mirror. By executing the change in the scanning speed as described above, occurrence of the unnecessary vibration can be prevented, and the above-described problem of image quality degradation can be more effectively solved.

In general, a scanning mirror often has a resonance characteristic in a non-resonant axial direction of 700 Hz or more. Therefore, in a particularly preferred embodiment, the scanning mirror drive unit may execute change in the scanning speed so that the frequency component of the drive voltage waveform in the drawing region is, for example, 600 Hz or less, preferably 500 Hz or less, and more preferably 400 Hz or less. Note that a lower limit value of the frequency component is not particularly necessary to be limited, but may be, for example, 50 Hz or more or 60 Hz or more. The drive voltage waveform is a waveform of drive voltage of the scanning mirror. As a result, resonance can be prevented, that is, occurrence of unnecessary vibration can be prevented.

Furthermore, the drive voltage waveform may be a drive voltage waveform not including a frequency component 1/n times (here, n is an arbitrary integer, which may be, for example, at least one of 1 to 30, in particular, 1 to 25) a resonance frequency component of the scanning mirror. As a result, a harmonic of the drive voltage waveform does not overlap the resonance frequency of the scanning mirror, and resonance can be prevented, that is, occurrence of unnecessary vibration can be prevented.

In one embodiment of the present disclosure, the scanning mirror drive unit drives the scanning mirror such that the non-resonant axial direction scanning speed of the laser light reaching the region including the fovea is slower than the non-resonant axial direction scanning speed of the laser light reaching the region not including the fovea. In a case where the Foveated rendering technology is applied, with respect to the scanning speed of the laser light for scanning the drawing region of one frame in the non-resonant axial direction, the non-resonant axial direction scanning speed when drawing the region including the fovea is slower than the non-resonant axial direction scanning speed when drawing another region. As a result, it is possible to selectively improve the image quality of the region of the display device that the user is gazing at.

The display device of the present disclosure may further include a line-of-sight detection unit. The line-of-sight detection unit may be configured to detect a line-of-sight of the user wearing the display device, and a device configuration thereof may be appropriately selected by a person skilled in the art. For example, the line-of-sight detection unit may be configured to detect a line-of-sight on the basis of corneal reflection, or may be configured to detect a line-of-sight on the basis of a three-dimensional eyeball model. In the former case, the line-of-sight detection unit may include, for example, a light source (for example, an LED) configured to emit infrared light (in particular, near-infrared light) toward the eyeball, and an imaging element that acquires an image by the irradiation. In the latter case, the line-of-sight detection unit includes an imaging element configured to acquire a face image of a user of the display device. The line-of-sight is detected on the basis of the information regarding the eyeball obtained by analyzing the face image.

Preferably, the line-of-sight detection unit may be configured to identify, on the basis of the detected line-of-sight, a region including the fovea. For example, the line-of-sight detection unit may identify a position of the fovea, and then identify the region including the fovea on the basis of the identified position of the fovea. The scanning mirror drive unit may drive the scanning mirror on the basis of the region including the fovea identified by the line-of-sight detection unit. The region including the fovea may be a region including the fovea and covering an angle of view of 4 degrees or more in the non-resonant axial direction. For example, the region including the fovea may be, for example, a region covering an angle of view of 4 degrees or more and 60 degrees or less, in particular, 6 degrees or more and 30 degrees or less in the non-resonant axial direction. The region including the fovea may be flexibly changed in the drawing region on the basis of, for example, the detected line-of-sight or the position of the fovea.

The display device of the present disclosure may drive the scanning mirror such that the scanning line in the non-resonant axial direction is heavier in density (that is, the scanning line interval becomes narrower) in a case of drawing in the region including the identified fovea as compared with a case of drawing in other regions.

In a particularly preferred embodiment, the display device of the present disclosure further includes two or more laser beams having mutually different beam diameters. By including the two or more laser beams, it is possible to prevent image quality degradation due to presence of a region where the scanning line is light in density and a region where the scanning line is heavy in density in the drawing region of one frame in a case where the Foveated rendering technology is applied.

For example, the two or more laser beams are configured such that, for example, on the scanning mirror, the beam diameter of the laser light reaching the region including the fovea is greater than the beam diameter of the laser light reaching the region not including the fovea.

For example, in a retina direct drawing type display device, a magnitude relationship between the beam diameters of the two laser beams emitted from two laser light sources is the same at a time of emission from the laser and at a time of reaching a retina, but may be opposite on the scanning mirror. Therefore, by configuring the laser as described above on the scanning mirror as described above, the region where the scanning line is heavy in density at the time of reaching the retina can be drawn by laser light having a smaller beam diameter.

For example, a laser light source having a smaller beam diameter is used at an emission point to perform drawing in a region having a low scanning speed in the non-resonant axial direction, and a laser light source having a larger beam diameter is used at the emission point to perform drawing in a region having a high scanning speed in the non-resonant axial direction. As a result, image quality degradation caused by the presence of the heavy part and light part in terms of density can be eliminated.

A projection target that the laser light scanned by the scanning mirror reaches may be, for example, a retina of an animal (in particular, a human) or an arbitrary projection surface other than the retina. In a case where the projection target is a retina, for example, a hologram element may be used for projection onto the retina. In a case where the projection target is an arbitrary projection surface, the projection surface includes, but is not limited to, a wall, a desk, a screen, and the like, for example. In this case, the display device is used in a mode in which the user recognizes the video displayed on the projection surface.

According to one embodiment of the present disclosure, the display device may further include a hologram element that condenses the laser light near a pupil to cause the laser light to reach a retina, the laser light being scanned by the scanning mirror. That is, the display device according to the present disclosure may be configured to condense the laser light near a pupil to cause the laser light to reach a retina, the laser light being scanned by the scanning mirror. By condensing the laser light near the pupil, it is possible to present a video in a so-called Maxwellian viewing.

In the present disclosure, for example, the scanned laser light may be condensed on the pupil or may be shifted from the pupil by several mm to a dozen mm (for example, 1 mm to 20 mm, in particular, 2 mm to 15 mm) in an optical axis direction. As in the latter case, the Maxwellian viewing can be achieved even if a focal point is not on the pupil. Shifting the focal point in the optical axis direction can make it difficult for the user to lose a video image even if the video image is shifted. The diffracted light may be condensed on the pupil, in a crystalline lens, or between a corneal surface and the pupil.

According to another embodiment of the present disclosure, the display device may cause the laser light scanned by the scanning mirror to reach the projection surface without through a projection optical system, or through a projection optical system. That is, the display device may be configured as a projector that projects a video onto any projection surface. The projector may be configured as, for example, a small projector (also referred to as a pico projector).

2. First Embodiment of Present Disclosure (Retina Direct Drawing Type Display Device)

2-1. First Example of First Embodiment (Drawing System Including Two Laser Drive Units)

According to one embodiment of the present disclosure, the display device may further include a hologram element that condenses the laser light near a pupil to cause the laser light to reach a retina, the laser light being scanned by the scanning mirror. The hologram element enables projection of a video image of a retina direct drawing type. The retina direct drawing type video projection is also referred to as video projection in the Maxwellian viewing.

Hereinafter, an example of the display device according to this embodiment will be described with reference to FIGS. 1A and 1B.

FIG. 1A illustrates a configuration example of a display device 100 according to the present disclosure. The display device 100 includes a drawing system 101, a line-of-sight detection unit 102, a collimator lens 103, a scanning mirror 104, a relay lens 105, and a hologram element 106.

The display device 100 is configured to receive video data from an information processing device (for example, a computer, a cloud, or the like) 120 and present a video in the Maxwellian viewing to the user on the basis of the video data. More specifically, for the video presentation, the laser light emitted from the drawing system 101 is reflected by the scanning mirror 104, diffracted by the hologram element 106, and then condensed near a pupil 108 in an eyeball 107 to be applied to the retina.

The drawing system 101 may be configured to emit laser light for presenting a video toward the scanning mirror 104 on the basis of a received video signal.

Figure 1B:
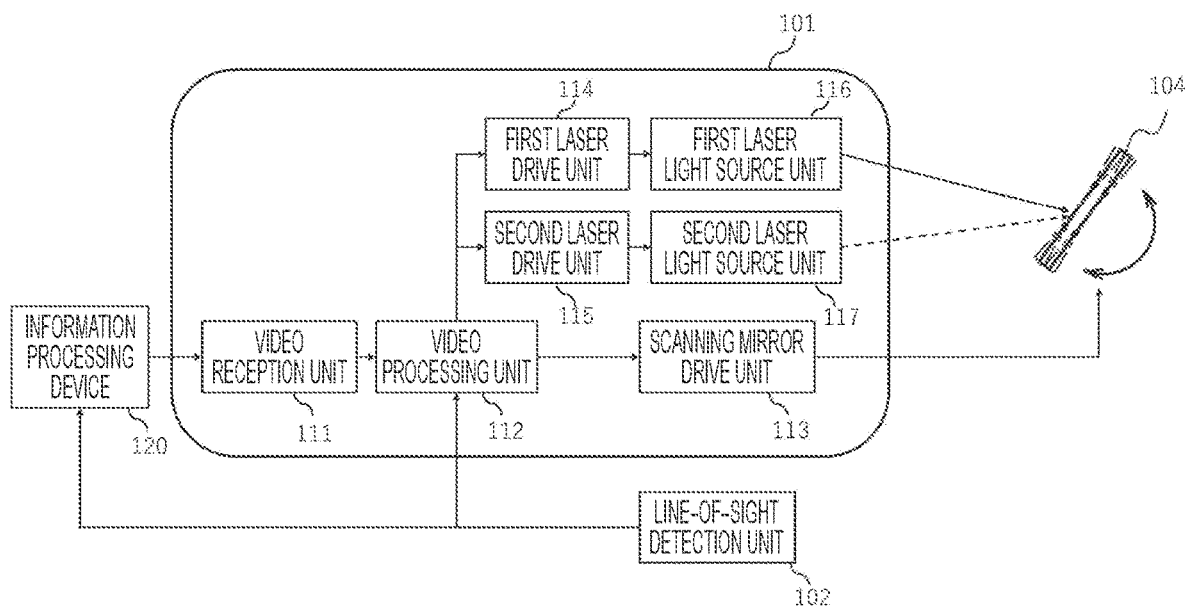
FIG. 1B is an example of a block diagram of a drawing system included in the display device according to the present disclosure.

FIG. 1B is an example of a block diagram of components included in the drawing system 101. The drawing system 101 includes a video reception unit 111, a video processing unit (VP) 112, a scanning mirror drive unit 113, a first laser drive unit 114, a second laser drive unit 115, a first laser light source unit 116, and a second laser light source unit 117. These components will be described below.

The video reception unit 111 receives a video signal transmitted from the information processing device 120, and then transmits the video signal to the video processing unit 112 to the video processing unit 112. The video reception unit 111 may be a video receiver, and more specifically, may be a digital video receiver or an analog video receiver. The digital video receiver may be, for example, a digital video receiver conforming to a standard such as DVI, HDMI (registered trademark), or DisplayPort. The analog video receiver may be, for example, an analog RGB receiver.

The video processing unit 112 receives the video signal transmitted from the video reception unit 111, and controls the display device 100 on the basis of the video signal. For example, the video processing unit 112 controls the scanning mirror drive unit 113 and the first laser drive unit 114 and/or the second laser drive unit 115 on the basis of the video signal. As a result, video presentation with the laser light is performed. Furthermore, in addition to the video signal, the video processing unit 112 may control the video to be presented, on the basis of the information regarding the line-of-sight acquired by the line-of-sight detection unit 102. The video processing unit 112 may include, for example, a microprocessor, a system-on-a-chip (SoC), and a field-programmable gate array (FPGA).

Note that the drawing system 101 may include a video accumulation unit (not illustrated). The video accumulation unit writes and/or reads a signal in order to process the video signal output from the video reception unit 111. The video accumulation unit includes, for example, an SRAM or a DRAM, and, in particular, may include an SDRAM, a DDR SDRAM, or the like.

(1) Scanning Mirror and Scanning Mirror Drive Unit

The scanning mirror 104 scans laser light emitted from the drawing system 101 (in particular, the laser light source units 116 and 117). As a result of the scanning, a video image is formed. A scanning cycle of the scanning mirror 104 may be, or may not be synchronized with the video signal input from the information processing device 120.

For example, the scanning mirror 104 may be a micro electro mechanical systems (MEMS) mirror. As the MEMS mirror, a commercially available MEMS mirror may be used, or a MEMS mirror manufactured by a method known in the art may be used. MEMS mirrors may be typically fabricated by microfabrication technologies of semiconductor processes. The MEMS mirror scans light by resonance of a minute mirror of about Φ1 mm.

The scanning mirror 104 may be a scanning mirror operable in two axial directions, or may be a combination of two scanning mirrors capable of scanning in one axial direction. As a result, a two-dimensional video can be projected.

The scanning mirror drive unit 113 outputs a drive signal for driving the scanning mirror 104. The scanning mirror drive unit 113 may include, for example, a D/A converter that converts a digital signal from the video processing unit 112 into an analog signal. The scanning mirror drive unit 113 may further include an operational amplifier that amplifies the output signal generated by the conversion to a drive voltage level of the scanning mirror 104.

The scanning mirror drive unit 113 drives a scanning mirror such that, in a case where two or more mutually different non-resonant axial direction scanning speeds are used in a drawing region of one frame of a video formed by a laser light scanning, the non-resonant axial direction scanning speed gradually changes between the different non-resonant axial direction scanning speeds. The change will be described below with reference to FIGS. 2 and 3.

Figure 2:
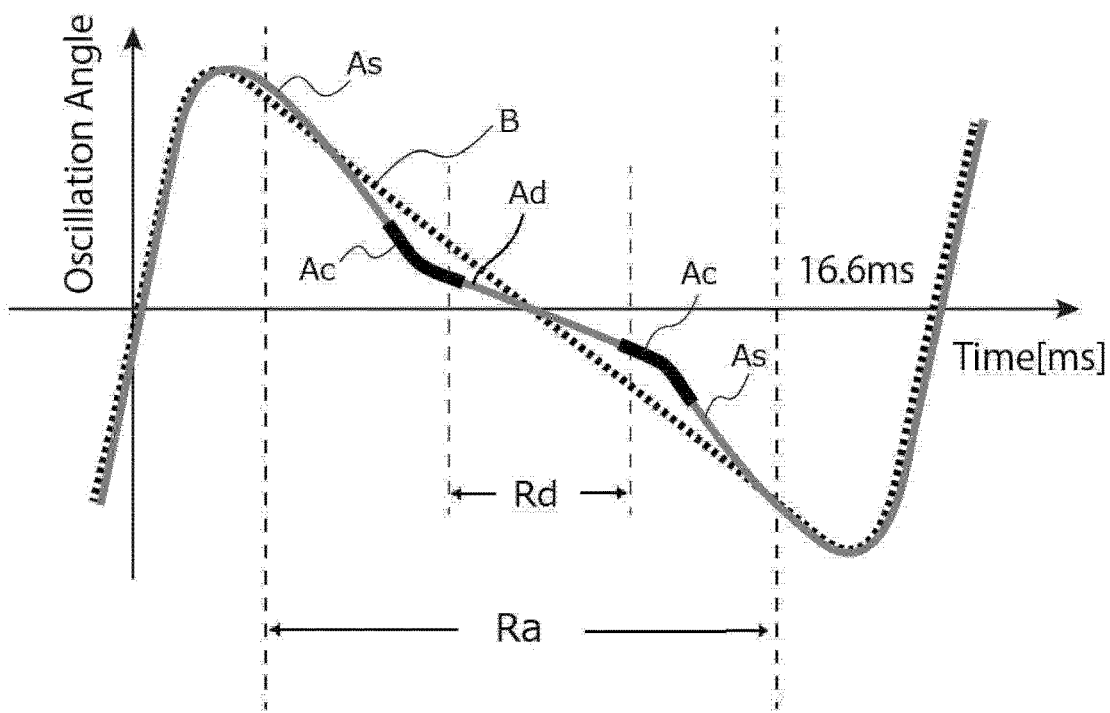
FIG. 2 illustrates a schematic graph of a non-resonant axial direction scanning oscillation angle with respect to time.
Figure 3:
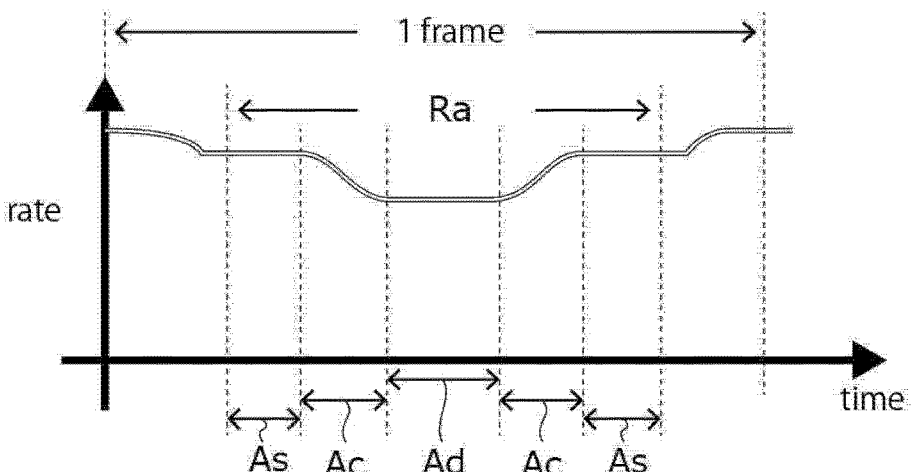
FIG. 3 illustrates a schematic graph of a non-resonant axial direction scanning speed with respect to time.

FIG. 2 illustrates a schematic graph of a non-resonant axial direction scanning oscillation angle (Oscillation Angle) with respect to time (Time). FIG. 3 illustrates a schematic graph of a non-resonant axial direction scanning speed (rate) with respect to time (Time). A section Ra illustrated in these drawings corresponds to the time for scanning a drawing region in one frame.

In a case where the non-resonant axial direction scanning speed does not change within the drawing region of one frame, the scanning oscillation angle changes such that a plot of the scanning oscillation angle with respect to the time draws a straight line, that is, a graph of a linear function, as indicated by a dotted line B in FIG. 2.

A case where there are two different non-resonant axial direction scanning speeds is assumed as a case where a non-resonant axial direction scanning speed changes in a drawing region of one frame. That is, there is assumed a case where, in the drawing region of one frame, there are a section in which scanning is performed at a certain constant non-resonant axial direction scanning speed and a section in which scanning is performed at another constant non-resonant axial direction scanning speed different from the certain constant non-resonant axial direction scanning speed. Parts corresponding to the two different non-resonant axial direction scanning speeds are indicated by gray lines (two As parts and one Ad part) in FIG. 2. Furthermore, in FIG. 3, these parts are parts (two As parts and one Ad part) parallel to a horizontal axis (time axis). The scanning speed in the Ad part is slower than the scanning speed in the As parts. As a result, a scanning line interval in the Ad part is narrower than the scanning line intervals in the As parts, that is, the scanning line is heavier in density.

If the non-resonant axial direction scanning speed is rapidly changed from the scanning speed in the Ad part to scanning speed in an As part, unnecessary vibration of the scanning mirror may occur. Then, the unnecessary vibration may cause image quality degradation. Therefore, the scanning mirror drive unit 113 included in the display device 100 according to the present disclosure drives the scanning mirror such that the scanning speed gradually changes between these two scanning speeds.

Sections in which the non-resonant axial direction scanning speed gradually changes are Ac parts in these drawings. In an Ac part, the scanning mirror drive unit 113 drives the scanning mirror such that the scanning speed gradually changes. More specifically, the scanning mirror drive unit 113 gradually changes the scanning speed from the scanning speed in the Ad part to the scanning speed in an As part (the Ac part on a left side in these drawings), or from the scanning speed in an As part to the scanning speed in the Ad part (the Ac part on a right side in these drawings).

In one embodiment of the present disclosure, in a period Ac in which the scanning speed gradually changes, the scanning mirror drive unit 113 may apply, to the scanning mirror 104, a voltage having a frequency component sufficiently lower than a resonance frequency component of the scanning mirror 104, or a voltage having a voltage waveform in which a harmonic component of a waveform of voltage applied does not overlap the resonance frequency component of the scanning mirror. By executing the change in the scanning speed as described above, occurrence of the unnecessary vibration can be prevented, and image quality degradation associated with unnecessary vibration can be more effectively prevented.

The voltage having a frequency component sufficiently lower than the resonance frequency component of the scanning mirror 104 may be, for example, a voltage having a frequency of 600 Hz or less, preferably 500 Hz or less, and more preferably 400 Hz or less. Furthermore, the voltage having a frequency component sufficiently lower than the resonance frequency component of the scanning mirror 104 may be, for example, 10 Hz or more, 20 Hz or more, or 30 Hz or more. Such a drive voltage can prevent resonance of the scanning mirror, that is, can prevent occurrence of unnecessary vibration.

Furthermore, the voltage having a frequency component sufficiently lower than the resonance frequency component of the scanning mirror 104 may be, for example, a voltage having a frequency component $\frac{1}{20}$ or less, $\frac{1}{25}$ or less, or $\frac{1}{30}$ or less the resonance frequency component (Hz). Furthermore, the voltage having a frequency component sufficiently lower than the resonance frequency component of the scanning mirror 104 may be, for example, a voltage having a frequency component $\frac{1}{1000}$ or more, $\frac{1}{500}$ or more, or $\frac{1}{100}$ or more the resonance frequency component (Hz). Such a drive voltage can prevent resonance of the scanning mirror, that is, can prevent occurrence of unnecessary vibration.

Furthermore, a voltage having a voltage waveform in which a harmonic component of a waveform of the voltage applied does not overlap the resonance frequency component of the scanning mirror may be, for example, a voltage set such that a value of an integral multiple of the harmonic component does not fall within ±1%, ±2%, or ±3% of the resonance frequency.

Furthermore, a voltage having a voltage waveform in which a harmonic component of a waveform of the voltage applied does not overlap the resonance frequency component of the scanning mirror may be, for example, a voltage having the harmonic component set at $\frac{1}{500}$ or less, $\frac{1}{1000}$ or less, or $\frac{1}{2000}$ or less the resonance frequency component.

Furthermore, the drive voltage waveform may be a drive voltage waveform not including a frequency component 1/n times (here, n is an arbitrary integer, which may be, for example, at least one of 1 to 30, in particular, 1 to 25) a resonance frequency component of the scanning mirror. As a result, a harmonic of the drive voltage waveform does not overlap the resonance frequency of the scanning mirror, and resonance can be prevented, that is, occurrence of unnecessary vibration can be prevented.

The drive voltage waveform may be a drive voltage waveform not including a frequency component 1/n times (here, n is an arbitrary integer, which may be, for example, at least one of 1 to 30, in particular, 1 to 25) a resonance frequency component of the scanning mirror. As a result, a harmonic of the drive voltage waveform does not overlap the resonance frequency of the scanning mirror, and resonance can be prevented, that is, occurrence of unnecessary vibration can be prevented.

For example, the scanning mirror drive unit 113 may execute change in the scanning speed so that scanning mirror vibration caused by the mechanical resonance characteristic unique to the scanning mirror 104 does not occur. By the scanning speed gradually changing so that unnecessary vibration caused by the mechanical resonance characteristic does not occur, the above-described problem of image quality degradation can be more effectively solved.

For example, the scanning mirror drive unit 113 may execute change in the scanning speed so that the frequency component of the drive voltage waveform in the drawing region has a frequency sufficiently lower than the scanning mirror resonance frequency characteristic, or that a harmonic component of a waveform of voltage applied does not overlap the resonance frequency component. Examples of the frequency and the voltage waveforms may be as described above, and the description also applies here. By executing the change in the scanning speed as described above, occurrence of the unnecessary vibration can be prevented, and the above-described problem of image quality degradation can be more effectively solved.

For example, in an Ac part, for example, when the scanning speed is plotted with respect to the time, the scanning mirror drive unit drives the scanning mirror such that a spline curve or the like (in particular, a smooth curve) in the plot as illustrated in FIG. 3 is drawn.

Note that, in these drawings, two mutually different scanning speeds in the drawing region of one frame are adopted, but three or more different scanning speeds may be adopted in the drawing region of one frame. Furthermore, by gradually changing the scanning speed between these different scanning speeds, occurrence of unnecessary vibration can be prevented.

Figure 4:
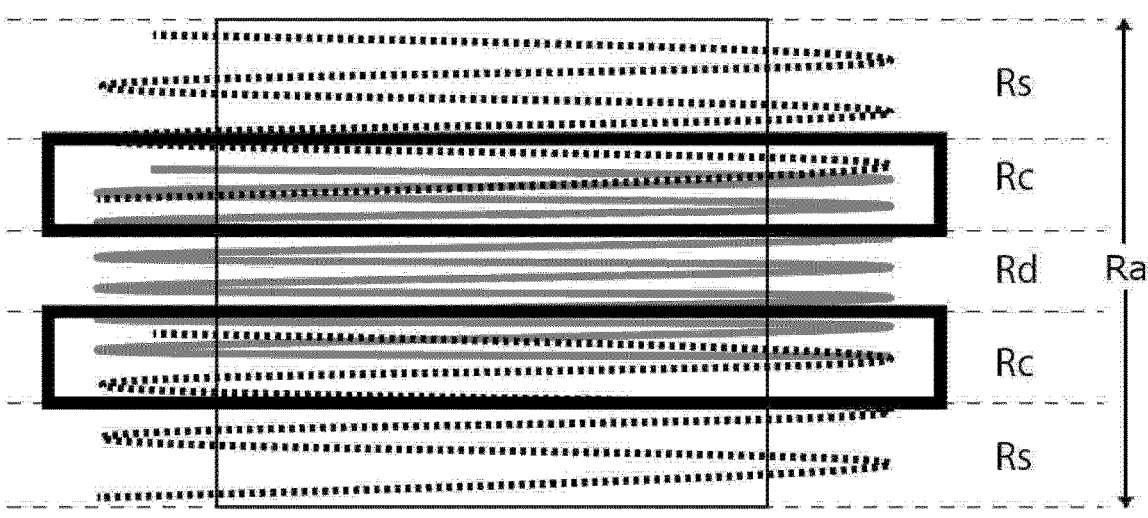
FIG. 4 illustrates a schematic diagram for describing a scanning line in a case where scanning speed is gradually changed according to the present disclosure.

FIG. 4 illustrates a schematic diagram for describing a scanning line in a case where the scanning speed is gradually changed according to the present disclosure.

A substantially square shape (corresponding to Ra) indicated by a solid line in the drawing is a drawing region in one frame. By changing the scanning speed as described with reference to FIGS. 2 and 3, for example, the scanning line is light in density in sections Rs as indicated by dotted lines, and the scanning line is heavy in density in a section Rd as indicated by a solid line. Then, there is a section Rc in which the scanning speed transition, between a section Rs and the section Rd. Note that control of laser light in these sections will be described later.

(2) Laser Light Source and Laser Drive Unit

The first laser drive unit 114 outputs a drive signal for driving the first laser light source unit 116. The first laser drive unit 114 may include, for example, a D/A converter that converts a digital signal output from the video processing unit 112 into an analog signal.

The second laser drive unit 115 outputs a drive signal for driving the second laser light source unit 117. The second laser drive unit 115 may include, for example, a D/A converter that converts a digital signal output from the video processing unit 112 into an analog signal.

The first laser light source unit 116 and the second laser light source unit 117 may be driven by the first laser drive unit 114 and the second laser drive unit 115, respectively. Many commercially available laser drive units correspond to RGB 3ch laser light sources, and in order to drive the two laser light source units, it is preferable to provide laser drive units that drive the respective laser light source units. Furthermore, in a case where the laser drive units that drives the respective laser light source units are provided, each of the laser drive units can be collectively controlled by an enable function, thereby improving efficiency of the video processing.

The first laser light source unit 116 is driven by the first laser drive unit 114 to output laser light. The laser light is scanned, and thereby a video is presented to the user.

The second laser light source unit 117 also is driven by the second laser drive unit 115 to output laser light. The laser light is scanned, and thereby a video is presented to the user.

Figure 5:
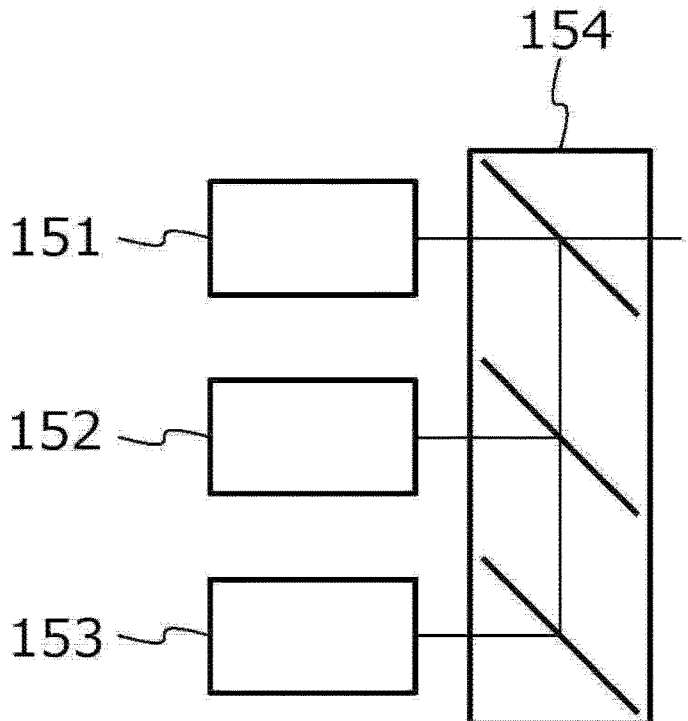
FIG. 5 illustrates a configuration example of a laser light source unit.

FIG. 5 illustrates a configuration example of the first laser light source unit 116. The first laser light source unit 116 may include, for example, three laser light sources 151, 152, and 153. The first laser light source unit 116 further includes a multiplexing unit 154 that multiplexes laser light groups emitted from these laser light source groups.

These laser light sources may be laser light sources of colors of red, blue, and green, respectively. The three rays of laser light emitted from these laser light sources are multiplexed by the multiplexing unit 154. The multiplexing unit 154 may include one or more of, for example, a prism, a dichroic mirror, and a polarization beam splitter. The configuration of the multiplexing unit 154 may be appropriately designed by those skilled in the art so that the laser light group to be multiplexed is multiplexed. Specific configuration of components (a prism, a dichroic mirror, a polarization beam splitter, and the like for example) included in the multiplexing unit 154 may be appropriately set according to, for example, arrangement of the laser light sources and a position of an incident port, or the like. The three rays of laser light are multiplexed by the multiplexing unit 154, and the multiplexed laser light is emitted from the first laser light source unit 116.

The second laser light source unit 117 may be configured in the same manner as the first laser light source unit 116 except that a beam diameter of the multiplexed laser light is different at the emission port. In order to cause a difference in beam diameter, for example, a beam diameter of a laser light source group included in the first laser light source unit 116 may be different from a beam diameter of a laser light source group included in the second laser light source unit 117. Note that, from the viewpoint of visibility, a laser light source of blue color light may have the same beam diameter between these two laser light source units.

On the scanning mirror 104, a beam diameter of the laser light emitted from the first laser light source unit 116 may be larger than a beam diameter of the laser light emitted from the second laser light source unit 117. As described above, because the two laser light source units are configured to be able to emit laser beams having mutually different beam diameters, it is possible to improve image quality in a case where there are a region where the scanning line in the non-resonant axial direction is light in density and a region where the scanning line is heavy in density in the non-resonant axial direction in a drawing region of one frame.

Figure 6:
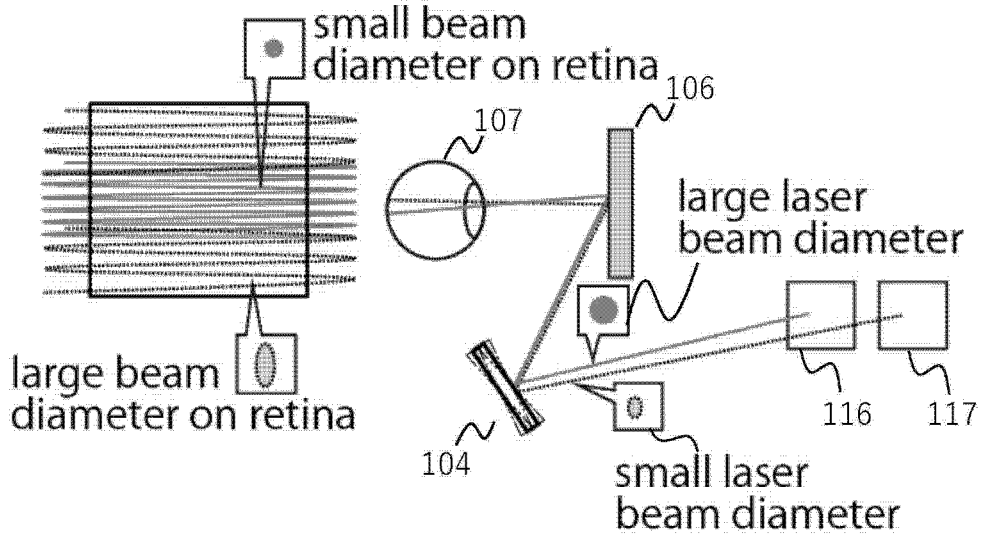
FIG. 6 is a diagram for describing a relation between a laser beam diameter at an emission port of a laser light source and a laser beam diameter at a time of reaching a retina.

A laser beam diameter on the scanning mirror and a laser beam diameter when reaching the retina will be described with reference to FIG. 6.

For example, the first laser light source unit 116 emits laser light having a smaller beam diameter at the emission point of each laser light source than the second laser light source unit 117 does. At a time of emission, a small beam diverges at a large angle. Therefore, in the display device 100 of a retina direct drawing type, the magnitude relationship between these beam sizes is opposite on an optical path from the collimator lens 103 to the scanning mirror 104, for example. That is, on the scanning mirror 104, a beam diameter of the laser light (gray solid line) emitted from the first laser light source unit 116 is larger than a beam diameter of the laser light (dotted line) emitted from the second laser light source unit 117.

A magnitude relationship of the beam diameters on the scanning mirror is opposite when the beams reach the retina of the eyeball 107 of the user. For example, at a stage of reaching the retina of the eyeball 107 of the user, laser light having a larger beam diameter on the scanning mirror has a beam diameter smaller than laser light having a smaller beam diameter on the scanning mirror. Then, the laser light having a smaller beam diameter (laser light derived from the first laser light source unit 116) reaches a region, of the drawing region, where the scanning line is heavy in density, and the laser light having a larger beam diameter (laser light derived from the second laser light source unit 117) reaches a region, of the drawing region, where the scanning line is light in density. As described above, by selectively emitting the laser beams according to the density of the scanning line, the image quality can be improved as compared with a case where rays of laser light having the same beam diameter are emitted over an entire drawing region.

In a preferred embodiment of the present disclosure, on the scanning mirror, the beam diameter of the laser light reaching the region including the fovea may be greater than the beam diameter of the laser light reaching the region not including the fovea. For example, the laser light (the beam diameter on the scanning mirror is larger than the laser light derived from the second laser light source unit 117, and the beam diameter at a time of reaching the retina is smaller than the laser beam derived from the second laser light source unit 117) derived from the first laser light source unit 116 reaches a region including the fovea, and the laser light derived from the second laser light source unit 117 reaches a region not including the fovea. By controlling the laser light by the drawing system 101 as described above, it is possible to prevent image quality degradation due to the presence of a part where the scanning line is light in density and a part where the scanning line is heavy in density in a case where the Foveated rendering technology is applied.

Control of these two laser light source units will be described below with reference to FIG. 4.

As illustrated in FIG. 4, in a case where the scanning speed is gradually changed in the drawing region of one frame according to the present disclosure, there at least are, in the drawing region, a region Rs where the scanning line is light in density, a region Rd where the scanning line is heavy in density, and a region Rc of transition where the scanning speed gradually changes. The display device 100 includes the two laser light source units that emit the above-described laser beams having mutually different beam diameters, by which image quality degradation caused by the difference in the scanning line interval can be eliminated.

For example, the first laser light source unit 116 emits laser light to draw the region Rd where the scanning line is heavy in density. In the drawing in the region Rd, the laser light emission by the second laser light source unit 117 may be stopped.

Furthermore, the second laser light source unit 117 emits laser light to draw the region Rs where the scanning line is light in density. In the drawing in the region Rs, the laser light emission by the first laser light source unit 116 may be stopped.

The video processing unit 112 controls the first laser drive unit 114 and the second laser drive unit 115 such that these laser light source units emit laser light as described above.

By controlling the laser light irradiation as described above, image quality degradation caused by the difference in the scanning line interval can be eliminated.

Both of these two laser light source units may be used to draw in the region Rc. For example, emissions by these two laser light source units may be controlled for each non-resonant axial direction scanning line.

Figure 7:
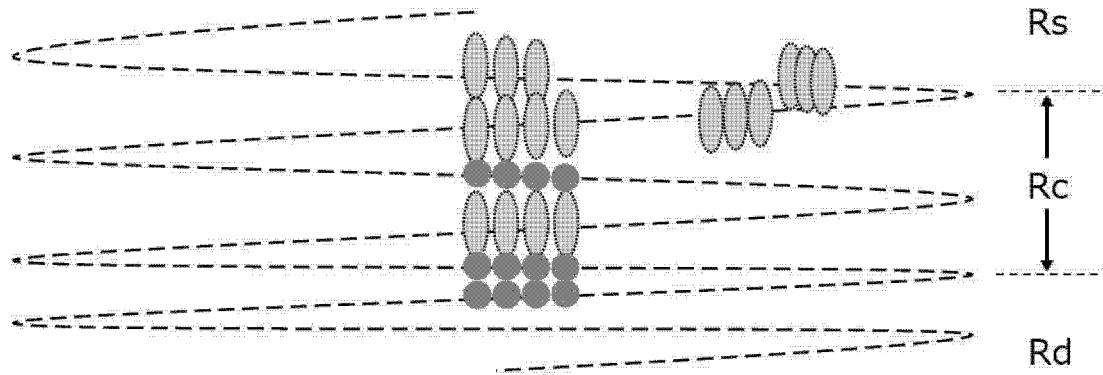
FIG. 7 is a diagram for describing selection of laser for drawing a scanning line in a drawing region.

For example, as illustrated in FIG. 7, in the region Rc, the emissions by the two laser light source units may be controlled such that the scanning line drawn by the first laser light source unit 116 and the scanning line drawn by the second laser light source unit 117 appear alternately in the region Rc, for example.

Alternatively, output by the second laser light source unit 117 may be weakened and output by the first laser light source unit 116 may be strengthened as approaching the region Rd from the region Rs. Conversely, the output by the first laser light source unit 116 may be weakened and the output by the second laser light source unit 117 may be strengthened as approaching the region Rs from the region Rd.

Alternatively, in order to draw in the region Rc, both the first laser light source unit 116 and the second laser light source unit 117 may be caused to emit light, and output by one or both of these two laser light source units may be weakened. In this case, for example, while drawing is performed by the first laser light source unit 116 having a larger beam diameter, drawing by the second laser light source unit 117 having a smaller beam diameter may be used to prevent recognition between scanning lines. Furthermore, in this case, in order to adjust brightness, output by each laser light source unit in a case of drawing in the region Rc may be smaller than output in a case of drawing in another region, and for example, each may be half the output.

As described above, the video processing unit 112 may control the first laser drive unit 114 and the second laser drive unit 115 such that the outputs of the laser light from these laser light source units are changed for each scanning line.

By controlling the laser light irradiation as described above, image quality can be improved.

(3) Line-of-Sight Detection Unit

The line-of-sight detection unit 102 may be configured to detect a line-of-sight of the user of the display device 100. The line-of-sight detection unit 102 may be configured to detect a line-of-sight on the basis of corneal reflection, or may be configured to detect a line-of-sight on the basis of a three-dimensional eyeball model. In the former case, the line-of-sight detection unit may include, for example, a light source (for example, an LED) configured to emit infrared light (in particular, near-infrared light) toward the eyeball, and an imaging element that acquires an image by the irradiation. In the latter case, the line-of-sight detection unit includes an imaging element configured to acquire a face image of a user of the display device. The line-of-sight is detected on the basis of the information regarding the eyeball obtained by analyzing the face image. The line-of-sight identifying processing based on the image acquired by the imaging element may be performed by, for example, an information processing unit included in the line-of-sight detection unit 102.

The line-of-sight detection unit 102 may transmit information regarding the identified line-of-sight to the drawing system 101 and/or the information processing device 120. The drawing system 101 and/or the information processing device 120 may adjust the video to be presented to the user on the basis of the information regarding the line-of-sight.

For example, the video processing unit 112 of the drawing system 101 may perform the Foveated rendering on the basis of the information regarding the line-of-sight. More specifically, the video processing unit 112 controls the non-resonant axial direction scanning speed of the scanning mirror 104 on the basis of the information regarding the line-of-sight. For example, the video processing unit 112 controls the scanning mirror drive unit 113 such that there are a section in which scanning is performed at two different scanning speeds and a section in which the scanning speed gradually changes between these different scanning speeds. For example, the video processing unit 112 controls the scanning mirror drive unit 113 such that the change in the scanning speed described above with reference to FIGS. 2 and 3 is performed, and the scanning mirror drive unit 113 drives the scanning mirror 104 according to the control.

Preferably, on the basis of the detected line-of-sight, the line-of-sight detection unit 102 may be configured to identify a region including the fovea. In the present specification, the region including the fovea may correspond to the region Rd where the scanning line is heavy in density as described above.

The line-of-sight detection unit 102 transmits information regarding the identified region including the fovea to the drawing system 101 (in particular, the video processing unit 112). The scanning mirror drive unit 113 may drive the scanning mirror on the basis of the region including the fovea identified by the line-of-sight detection unit.

Furthermore, the line-of-sight detection unit 102 may transmit information regarding the identified region including the fovea to the information processing device 120. The information processing device 120 may adjust the video signal to be transmitted to the display device 100 on the basis of the information.

On the basis of the region including the fovea, the video processing unit 112 may identify a first section in which scanning is performed at a certain constant scanning speed (fast non-resonant axial report scanning speed), a second section in which scanning is performed at another constant scanning speed (slow non-resonant axial report scanning speed) different from the certain constant scanning speed, and a third section in which the scanning speed gradually changes between these two sections. Alternatively, the identification may be performed by the line-of-sight detection unit 102 or may be performed by the information processing device 120.

The identification may be performed for each frame. This enables video processing according to the user's line-of-sight.

As described above, in the display device 100 of the present disclosure, the video processing unit 112 may identify the region including the fovea and one or more regions not including the fovea in the drawing region of one frame, on the basis of the information regarding the line-of-sight in particular, the information regarding the region including the fovea). Moreover, the video processing unit 112 may assign a slower non-resonant axial direction scanning speed to the region including the fovea, and assign a faster non-resonant axial direction scanning speed to one or more regions not including the fovea. On the basis of these assignments, the scanning mirror drive unit 113 may drive the scanning mirror 104.

Moreover, the video processing unit 112 may select a laser light source unit to be driven in each of these three sections. For example, the video processing unit 112 may select the second laser light source unit 117 for the first section, select the first laser light source unit 116 for the second section, and select the first laser light source unit 116 and/or the second laser light source unit 117 for the third section. Alternatively, the selection may be performed by the line-of-sight detection unit 102 or may be performed by the information processing device 120. The selection of a laser light source unit for the third section may be performed for each scanning line as described above.

The selection may be performed for each frame. This enables video processing according to the user's line-of-sight.

As described above, in the display device 100 of the present disclosure, the video processing unit 112 may identify the region including the fovea and one or more regions not including the fovea in the drawing region of one frame, on the basis of the information regarding the line-of-sight in particular, the information regarding the region including the fovea). Moreover, the video processing unit 112 may assign a laser light source having a larger beam size on the scanning mirror (smaller beam size at the time of reaching the retina) to the region including the fovea, and may assign a laser light source having a smaller beam size on the scanning mirror (larger beam size at the time of reaching the retina) to one or more regions not including the fovea. On the basis of these assignments, a laser light source drive unit 114 may drive these laser light source units.

(4) Other Components

Although display device 100 illustrated in FIG. 1A includes the collimator lens 103, the collimator lens may not be provided between the drawing system 101 and the scanning mirror. The collimator lens 103 may be provided to convert laser light into parallel light, for example, in a case where the laser light emitted from the drawing system 101

(in particular, the laser light source units 116 and 117) is divergent light by being emitted from, for example, a PLC. The light projected onto the retina of the eyeball 107 is desirably parallel light. Therefore, the collimator lens 103 converts the laser light into parallel light, so that more preferable video projection can be performed.

The relay lens 105 may be appropriately selected by those skilled in the art depending on the shape and/or structure of the display device 100. For example, an optical system can be downsized by the relay lens 105.

The hologram element 106 is also called, for example, a holographic optical element, and condenses the laser light near a pupil to cause the laser light to reach a retina, the laser light being scanned by the scanning mirror 104. The hologram element 106 may be, for example, a volume hologram element. For example, the hologram element 106 may diffract light having a specific wavelength and a specific incident angle such that the light is condensed near the pupil. The hologram element 106 may have characteristics of both polarized light and a lens.

As illustrated in FIG. 1A, the light diffracted by the hologram element 106 is condensed near the pupil 108 in the eyeball 107 and then emitted to the retina. That is, the display device 100 can present a video to the user in a so-called Maxwellian viewing.

The display device 100 may further include, for example, various components used for video projection, such as a disk, a communication device, and a drive. The disk may store, for example, various video data and various programs such as a program for achieving video projection by the display device 100. The communication device may acquire a program and/or video data for controlling the display device 100, from a network, for example. The drive may read a program and/or video data recorded on, for example, a recording medium such as a microSD memory card and an SD memory card, and output to the RAM.

The display device 100 may be configured as, for example, a head mounted type display (head mounted display, hereinafter, also referred to as HMD). The head mounted type display may be, for example, a transmissive HMD or a non-transmissive HMD.

The transmissive HMD may be configured as, for example, an eyeglasses type display. In this case, the hologram element 106 may transmit light from an outside view to reach the eye. The hologram element 106 may be provided in a part corresponding to a lens of eyeglasses. The video presented by the display device 100 can be superimposed on the outside view by the transmissive HMD, and for example, AR can be provided to the user.

The non-transmissive HMD may completely cover both eyes, for example. In this case, light from the outside view does not reach the eyes.

Figure 10:
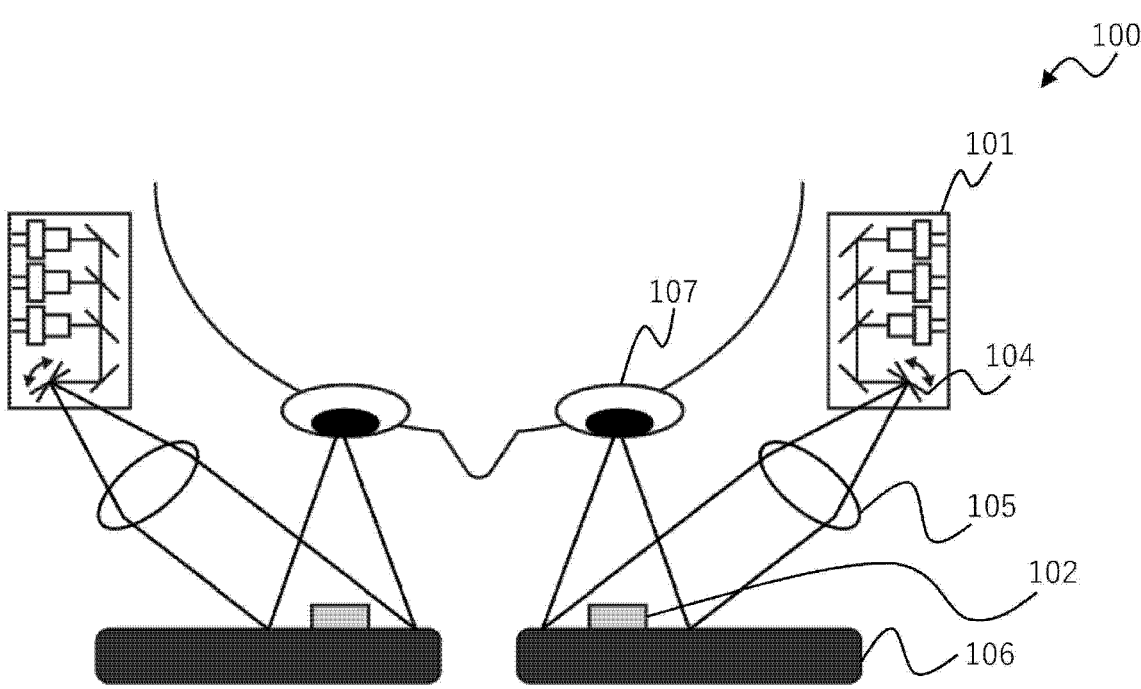
FIG. 10 illustrates a schematic view of an example of a display device of the present disclosure configured as an eyeglasses type display device.

FIG. 10 illustrates a schematic view of a display device of the present disclosure configured as an eyeglasses type display device. As illustrated in FIG. 10, in the display device 100, the scanning mirror 104 is also housed in a housing in which the drawing system 101 is housed. As illustrated in the drawing, the drawing system 101 includes three laser light sources (for example, laser light sources of rays of light of three colors of red, green, and blue) and an optical element group (for example, a reflection mirror and a dichroic mirror, or the like) that multiplexes rays of laser light emitted from the laser light sources. The multiplexed laser light (for example, white laser light) is scanned by the scanning mirror 104. The laser light scanned by the scanning mirror 104 reaches the hologram element 106 via the relay lens 105.

As illustrated in FIG. 10, the hologram element 106 is disposed in front of the eyeball 107 of the user. The hologram element 106 may be disposed in a part corresponding to a lens of eyeglasses, for example. The hologram element 106 diffracts the scanned laser light toward the eyeball 107. The hologram element 106 diffracts the scanned laser light so that the scanned laser light is condensed near the pupil and reaches the retina. The scanned laser light reaches the retina without being refracted by the crystalline lens of the eyeball 107. As a result, the video is presented in the Maxwellian viewing.

The line-of-sight detection unit 102 included in the display device 100 may be disposed so as to detect the information regarding the line-of-sight from the eyeball 107, and may be disposed, for example, in a part corresponding to a rim, a lens, or a wraparound endpiece of eyeglasses.

As illustrated in FIG. 10, the set of components described above is provided to perform the video presentation and the line-of-sight detection also for the other eyeball of the user. Note that the display device of the present disclosure may be configured to perform the video presentation (and optionally the line-of-sight detection) for both eyes as described above, or may be configured to perform the video presentation (and optionally the line-of-sight detection) for one eye.

(5) Modifications (Scanning Method)

The video processing unit 112 may control the display device 100 so as to draw the scanning line in the drawing region with an interlace method or a progressive method. By adopting the interlace method among these methods, resolution of the video can be further improved.

(Division of Drawing Region and Quantity of Laser Light Source Units)

In FIGS. 2 and 3 described above, there is assumed a case where, in the drawing region of one frame, there are a region scanned at a certain constant scanning speed and a region scanned at another constant scanning speed different from the certain constant scanning speed. Then, between these two regions scanned at different constant scanning speeds, there is a region where the scanning speed is gradually changed.

In the present disclosure, a drawing region of one frame may be divided so as to include three or more regions scanned at mutually different constant scanning speeds. Then, between these regions scanned at different constant scanning speeds, there may be a region where the scanning speed is gradually changed.

In this case, the drawing system may include three or more laser light source units capable of emitting laser beams having mutually different beam diameters.

With the above configuration, image quality can be further improved.

(Multiplexing of Laser Light)

The first laser light source unit 116 described above includes the multiplexing unit 154 that multiplexes the laser light group, and the multiplexing unit includes, for example, an optical element such as a prism. The method for multiplexing the laser light group is not limited thereto. For example, the multiplexing unit 154 may include a planar lightwave circuit (PLC) that multiplexes laser light groups of a plurality of color lights. The planar lightwave circuit is, for example, an optical circuit integrated on a planar substrate including a material such as quartz glass.

(Region Including Fovea)

The region including the fovea may not be identified by the line-of-sight detection unit, but may be identified in advance on the basis of, for example, the angle of view and a viewing range. For example, regions including a fovea may be prepared in advance in a plurality of patterns, for example, 2 to 10 patterns, in particular, 3 to 7 patterns. Each of these patterns may be associated with a position of an eye or line of sight in advance. As a result, the video processing unit or the line-of-sight detection unit selects a region pattern including the fovea according to the position of the eye or the line-of-sight identified by the line-of-sight detection unit. The drawing system may control the scanning speed according to the selected pattern.

2-2. Second Example of First Embodiment
(Drawing System Including One Laser Drive Unit)

The drawing system 101 described in (1) described above includes two laser drive units, and these laser drive units are configured to drive the two laser light sources, respectively. In one embodiment of the present disclosure, one laser drive unit may be included in the drawing system. In this embodiment, the drawing system may include one laser drive unit and a laser selection unit that selects a laser light source driven by the laser drive unit. In a case where the drawing system includes one laser drive unit, one chip is sufficient to be used as the laser drive unit, and the device can be easily downsized as compared with the two laser drive units described in 2-1. above. This implementation will be described below with reference to FIG. 8.

Figure 8:
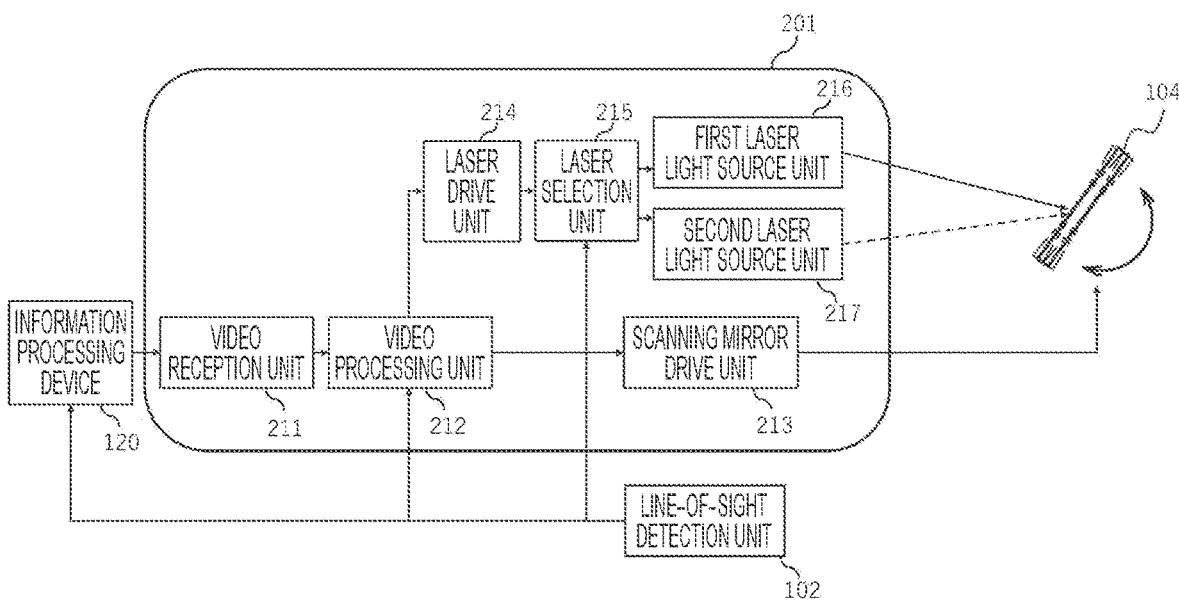
FIG. 8 is an example of a block diagram of a drawing system included in a display device according to the present disclosure.

A main difference between FIG. 8 and FIG. 1B is a configuration related to a drawing system. A drawing system 201 will be mainly described below.

The drawing system 201 includes a video reception unit 211, a video processing unit 212, a scanning mirror drive unit 213, a laser drive unit 214, a laser selection unit 215, a first laser light source unit 216, and a second laser light source unit 217.

The video reception unit 211, the video processing unit 212, the scanning mirror drive unit 213, the first laser light source unit 216, and the second laser light source unit 217 are the same as the video reception unit 111, the video processing unit 112, the scanning mirror drive unit 113, the first laser light source unit 116, and the second laser light source unit 117 described in (1) above, and description thereof also applies to the drawing system 201.

The laser drive unit 214 outputs a drive signal for driving the first laser light source unit 216 and/or the second laser light source unit 217. The laser drive unit 214 may include, for example, a D/A converter that converts a digital signal output from the video processing unit 212 into an analog signal.

The laser selection unit 215 includes a selection circuit that selects a laser light source to be driven on the basis of the drive signal output by the laser drive unit 214. The selection of the laser light source by the laser selection unit 215 will be described with reference to FIG. 2 described in (1) above.

The laser selection unit 215 selects the second laser light source unit 217 in the As part in FIG. 2. As a result of the selection, the second laser light source unit 217 is selected as a laser light source unit to be driven on the basis of the drive signal.

The laser selection unit 215 selects the first laser light source unit 216 in the Ad part in FIG. 2. As a result of the selection, the first laser light source unit 216 is selected as a laser light source unit to be driven on the basis of the drive signal.

The laser selection unit 215 selects the first laser light source unit 216 and/or the second laser light source unit 217 in the Ac part in FIG. 2. The selection may be performed, for example, for each scanning line in the non-resonant axial direction.

For example, in the Ac part, the laser light source unit to be driven on the basis of the drive signal is selected such that the scanning line drawn by the first laser light source unit 216 and the scanning line drawn by the second laser light source unit 217 appear alternately in the region Ac, for example. In this case, either of the laser light source units is driven for each scanning line.

Alternatively, output by the second laser light source unit 217 may be weakened and output by the first laser light source unit 216 may be strengthened as approaching the Ad part from the As part. Conversely, the output by the first laser light source unit 216 may be weakened and the output by the second laser light source unit 217 may be strengthened as approaching the Ad part from the As part. In this case, both laser light source units may be selected and driven.

The laser selection unit 215 may execute selection of a laser light source unit as described above on the basis of the information regarding the line-of-sight identified by the line-of-sight detection unit 102, in particular, on the basis of the information regarding the region including the fovea. For example, the laser selection unit 215 may select the second laser light source unit 217 for the first section, select the first laser light source unit 216 for the second section, and select the first laser light source unit 216 and/or the second laser light source unit 217 for the third section, the sections being described in (1) above. The selection of a laser light source unit for the third section may be performed for each scanning line as described above.

3. Second Embodiment of Present Disclosure
(Projector)

According to another embodiment of the present disclosure, the display device may cause the laser light scanned by the scanning mirror to reach the projection surface without through a projection optical system, or through a projection optical system. The display device may be configured as, for example, a small projector (also referred to as a pico projector).

Hereinafter, an example of the display device according to this embodiment will be described with reference to FIG. 9.

Figure 9:
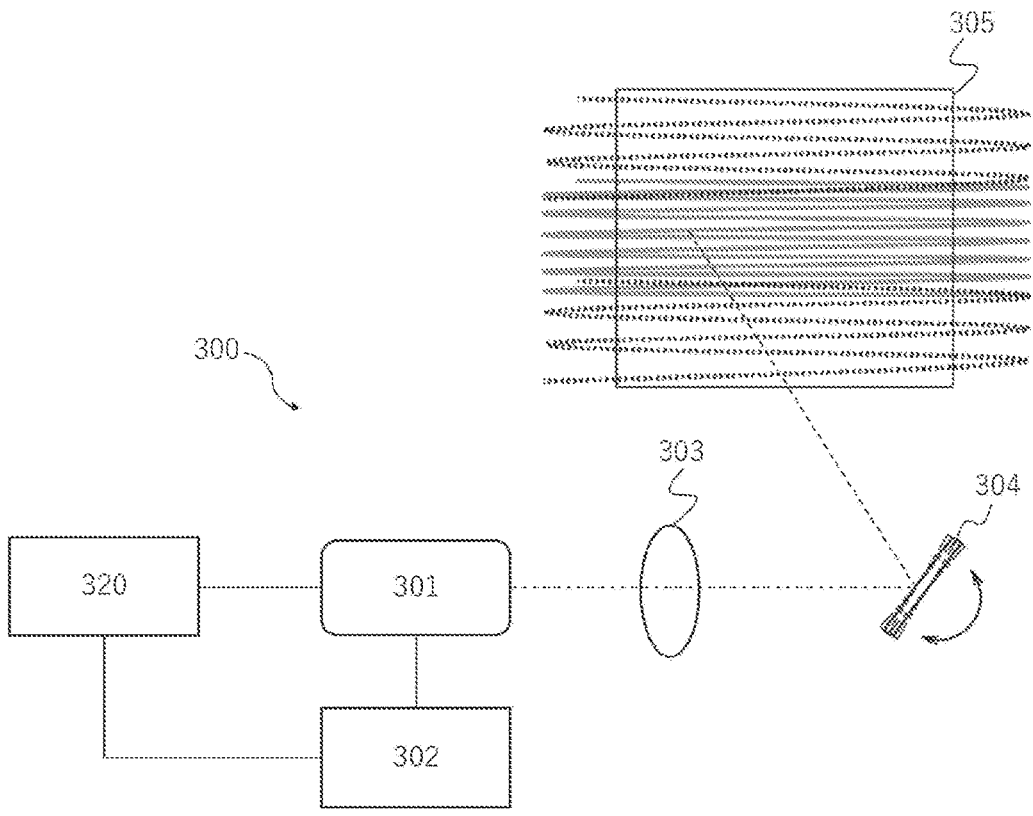
FIG. 9 is a diagram illustrating a configuration example of a display device according to the present disclosure.

FIG. 9 illustrates a configuration example of a display device 300 according to the present disclosure. The display device 300 includes a drawing system 301, a line-of-sight detection unit 302, a collimator lens 303, and a scanning mirror 304. These components included in the display device 300 may be the same as the drawing system 101, the line-of-sight detection unit 102, the collimator lens 103, and the scanning mirror 104 described above with reference to FIG. 1A, respectively, and the above description also applies to these components. Therefore, the description of these components will be omitted.

The display device 300 may be connected to, for example, an information processing device 320 that transmits a video signal to the drawing system.

Note that, in the optical system included in the display device 300, unlike the optical system included in the display device 100, the magnitude relationship of the laser beam diameters on the scanning mirror and the magnitude relationship of the laser beam diameters at the time of reaching the retina are not opposite. Therefore, on the scanning mirror, the beam diameter of the laser light reaching the region including the fovea may be smaller than the beam diameter of the laser light reaching the region not including the fovea. By controlling the laser light by the drawing system 301 as described above, it is possible to prevent image quality degradation due to the presence of a part where the scanning line is light in density and a part where the scanning line is heavy in density in a case where the Foveated rendering technology is applied.

The scanning mirror 304 scans laser light emitted from the drawing system 301. By the scanning, a video (for example, a two-dimensional video) includes the laser light. The laser light scanned by the scanning mirror 304 reaches any projection surface 305, and a video is displayed on the projection surface 305.

The display device 300 may be configured as a small projector, and may be configured as, for example, a human palm-sized projector. A small projector having this size is also called a pico projector.

The display device 300 may not necessarily include the collimator lens 303, but it is more preferable to include the collimator lens.

The display device 300 may cause the laser light scanned by the scanning mirror 304 to reach the projection surface 305 without through the projection optical system, or may cause the laser light to reach the projection surface 305 through the projection optical system. That is, in the display device 300, the projection optical system may not be provided or may be provided on the optical path between the scanning mirror 304 and the projection surface 305. The projection optical system may be used, for example, to enlarge or reduce a video formed by the scanning mirror 304. The projection optical system may include, for example, one or a plurality of lenses, or the like. Configuration of the projection optical system may be appropriately selected according to a desired video projection method.

Note that, the present disclosure can also have the following configuration.

[1]

A display device including a scanning mirror drive unit that drives a scanning mirror such that, in a case where two or more mutually different non-resonant axial direction scanning speeds are used in a drawing region of one frame of a video formed by a laser light scanning, non-resonant axial direction scanning speed gradually changes between the different non-resonant axial direction scanning speeds.

[2]

The display device according to [1], the display device further including a scanning mirror that performs laser light scanning for forming the video.

[3]

The display device according to [1] or [2], in which the scanning mirror drive unit executes change in the scanning speeds so that scanning mirror vibration caused by a mechanical resonance characteristic unique to the scanning mirror does not occur.

[4]

The display device according to any one of [1] to [3], in which the scanning mirror drive unit executes change in the scanning speeds so that resonance of the scanning mirror does not occur.

[5]

The display device according to any one of [1] to [4], in which, in a period in which the scanning speed gradually changes, the scanning mirror drive unit applies, to the scanning mirror, a voltage having a frequency component sufficiently lower than a resonance frequency component of the scanning mirror, or a voltage having a voltage waveform in which a harmonic component of a waveform of voltage applied does not overlap the resonance frequency component of the scanning mirror.

[6]

The display device according to any one of [1] to [5], in which a non-resonant axial direction scanning speed of laser light reaching a region including a fovea is slower than a non-resonant axial direction scanning speed of laser light reaching a region not including the fovea.

[7]

The display device according to any one of [1] to [6], the display device further including two or more laser beams having mutually different beam diameters.

[8]

The display device according to any one of [1] to [7], in which, on the scanning mirror, a beam diameter of laser light reaching a region including a fovea is greater than a beam diameter of laser light reaching a region not including the fovea.

[9]

The display device according to any one of [1] to [8], the display device further including a line-of-sight detection unit.

[10]

The display device according to [9], in which, on the basis of a detected line-of-sight, the line-of-sight detection unit identifies a region including a fovea.

[11]

The display device according to any one of [1] to [10], in which the scanning mirror drive unit drives the scanning mirror on the basis of a region including a fovea identified by the line-of-sight detection unit.

[12]

The display device according to any one of [1] to [11], in which the display device is configured to condense laser light near a pupil to cause the laser light to reach a retina, the laser light being scanned by the scanning mirror.

[13]

The display device according to any one of [1] to [11], in which the display device is configured to cause laser light scanned by the scanning mirror to reach a projection surface without through a projection optical system, or through a projection optical system.

REFERENCE SIGNS LIST

100 Display device
101 Drawing system
102 Line-of-sight detection unit
103 Collimator lens
104 Scanning mirror
105 Relay lens
106 Hologram element

The invention claimed is:

1. A display device, comprising:
a scanning mirror drive unit configured to drive a scanning mirror between a first non-resonant axial direction scanning speed of a plurality of non-resonant axial direction scanning speeds and a second non-resonant axial direction scanning speed of the plurality of non-resonant axial direction scanning speeds, wherein
a non-resonant axial direction scanning speed of the scanning mirror gradually changes between the first non-resonant axial direction scanning speed and the
second non-resonant axial direction scanning speed,
the scanning mirror is driven with the plurality of
non-resonant axial direction scanning speeds in a
drawing region of one frame of a video, and
the video is generated by a laser light scanning process
by the scanning mirror; and
a drawing system configured to emit a plurality of laser
beams on the scanning mirror, wherein a first beam
diameter of a first laser beam of the plurality of laser
beams is different from a second beam diameter of a
second laser beam of the plurality of laser beams.

2. The display device according to claim 1, further comprising the scanning mirror configured to execute the laser light scanning process to generate the video.

3. The display device according to claim 1, wherein the scanning mirror drive unit is further configured to execute the change in the non-resonant axial direction scanning speed to prevent occurrence of scanning mirror vibration that is caused by a mechanical resonance characteristic unique to the scanning mirror.

4. The display device according to claim 1, wherein the scanning mirror drive unit is further configured to execute the change in the non-resonant axial direction scanning speed to prevent occurrence of resonance of the scanning mirror.

5. The display device according to claim 1, wherein
in a period in which the non-resonant axial direction
scanning speed gradually changes, the scanning mirror
drive unit is further configured to apply one of a first
voltage or a second voltage to the scanning mirror,
a frequency component of the first voltage is lower than
a resonance frequency component of the scanning
mirror, and
a harmonic component of a waveform of the second
voltage is non-overlapped with the resonance frequency component of the scanning mirror.

6. The display device according to claim 1, wherein
the scanning mirror drive unit is further configured to
drive the scanning mirror such that a first non-resonant axial direction scanning speed of the plurality of laser
beams in a first region is slower than a second non-
resonant axial direction scanning speed of the plurality
of laser light beams in a second region,
the first region includes a fovea, and
the second region excludes the fovea.

7. The display device according to claim 1, wherein
the first beam diameter of the first laser beam is greater
than the second beam diameter of the second laser
beam,
the first laser beam with the first beam diameter falls on
a first region that includes a fovea, and
the second laser beam with the second beam diameter
falls on a second region that excludes the fovea.

8. The display device according to claim 1, the display device further comprising a line-of-sight detection unit.

9. The display device according to claim 8, wherein the line-of-sight detection unit is configured to:
detect a line-of-sight; and
identify a region that includes a fovea based on the
detected line-of-sight.

10. The display device according to claim 8, wherein
the line-of-sight detection unit is configured to identify a
region that includes a fovea, and
the scanning mirror drive unit is further configured to
drive the scanning mirror based on the identified
region.

11. The display device according to claim 1, wherein
the display device is configured to condense the plurality
of laser beams near a pupil to control the plurality of
laser beams to reach a retina, and the plurality of laser
beams is scanned by the scanning mirror.

12. The display device according to claim 1, wherein
the display device is configured to control the plurality of
laser beams to reach a projection surface by one of:
without passage through a projection optical system; or
passage through the projection optical system, and
the plurality of laser beams is scanned by the scanning
mirror.

* * * * *